(12) United States Patent
Lacourba et al.

(10) Patent No.: US 11,016,902 B2
(45) Date of Patent: May 25, 2021

(54) GENERATING RECOVERY DATA FOR AN INITIAL STATE OF STATUS DATA FOR A DATA HANDLING TRANSACTION AND PREDICTING A REVISED STATE OF THE STATUS DATA APPLICABLE TO RESOLUTION OF THE DATA HANDLING TRANSACTION

(71) Applicant: Arm Limited, Cambridge (GB)

(72) Inventors: Geoffray Matthieu Lacourba, Nice (FR); Andrew John Turner, Cambridge (GB); Alex James Waugh, Cambridge (GB)

(73) Assignee: Arm Limited, Cambridge (GB)

( * ) Notice: Subject to any disclaimer, the term of this patent is extended or adjusted under 35 U.S.C. 154(b) by 42 days.

(21) Appl. No.: 16/382,394

(22) Filed: Apr. 12, 2019

(65) Prior Publication Data

US 2020/0327062 A1   Oct. 15, 2020

(51) Int. Cl.
*G06F 12/0868* (2016.01)
*G06F 13/14* (2006.01)
*G06F 13/38* (2006.01)

(52) U.S. Cl.
CPC ......... *G06F 12/0868* (2013.01); *G06F 13/14* (2013.01); *G06F 13/385* (2013.01)

(58) Field of Classification Search
CPC ..... G06F 12/0868; G06F 13/385; G06F 13/14
See application file for complete search history.

(56) References Cited

U.S. PATENT DOCUMENTS

| | | | | |
|---|---|---|---|---|
| 10,229,066 | B2* | 3/2019 | Dooley | G06F 9/3824 |
| 2014/0149690 | A1* | 5/2014 | Chirca | G06F 12/0831 |
| | | | | 711/146 |
| 2014/0195745 | A1* | 7/2014 | Shiratori | G11B 5/00813 |
| | | | | 711/154 |
| 2016/0062893 | A1* | 3/2016 | Tune | G06F 12/0833 |
| | | | | 711/135 |
| 2018/0095893 | A1* | 4/2018 | Dooley | G06F 9/3824 |
| 2018/0225216 | A1* | 8/2018 | Filippo | G06F 12/0833 |

* cited by examiner

*Primary Examiner* — Francisco A Grullon
(74) *Attorney, Agent, or Firm* — Nixon & Vanderhye P.C.

(57) ABSTRACT

Circuitry comprises a data store to hold status data indicating a status of a first set of one or more devices connected to the interconnect circuitry; and control circuitry, responsive to initiation of a data handling transaction, to generate recovery data indicative of an initial state of the status data and to predict a predicted revised state of the status data applicable to resolution of the data handling transaction; the control circuitry being configured to change the status data to the predicted revised state in response to initiation of the transaction and before resolution of the transaction, and in response to a request to access the status data between the change of the status data to the predicted revised state and the resolution of the transaction, to provide access to the initial state of the status data, using the recovery data.

18 Claims, 7 Drawing Sheets

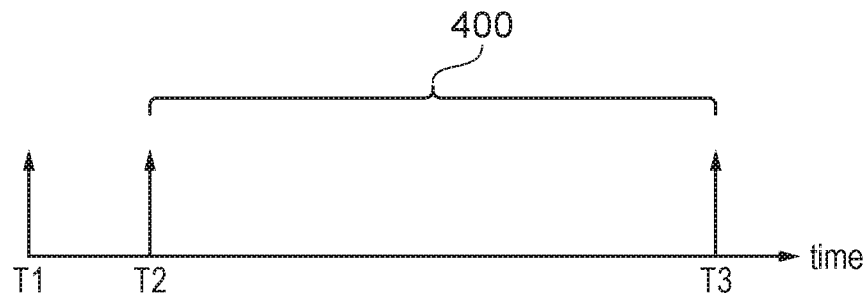
FIG. 4
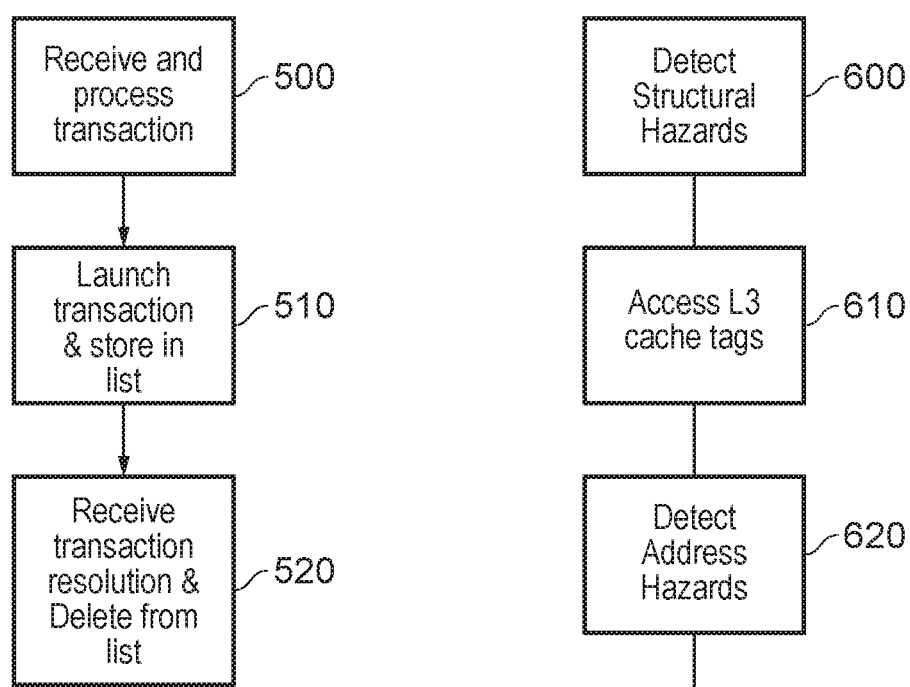

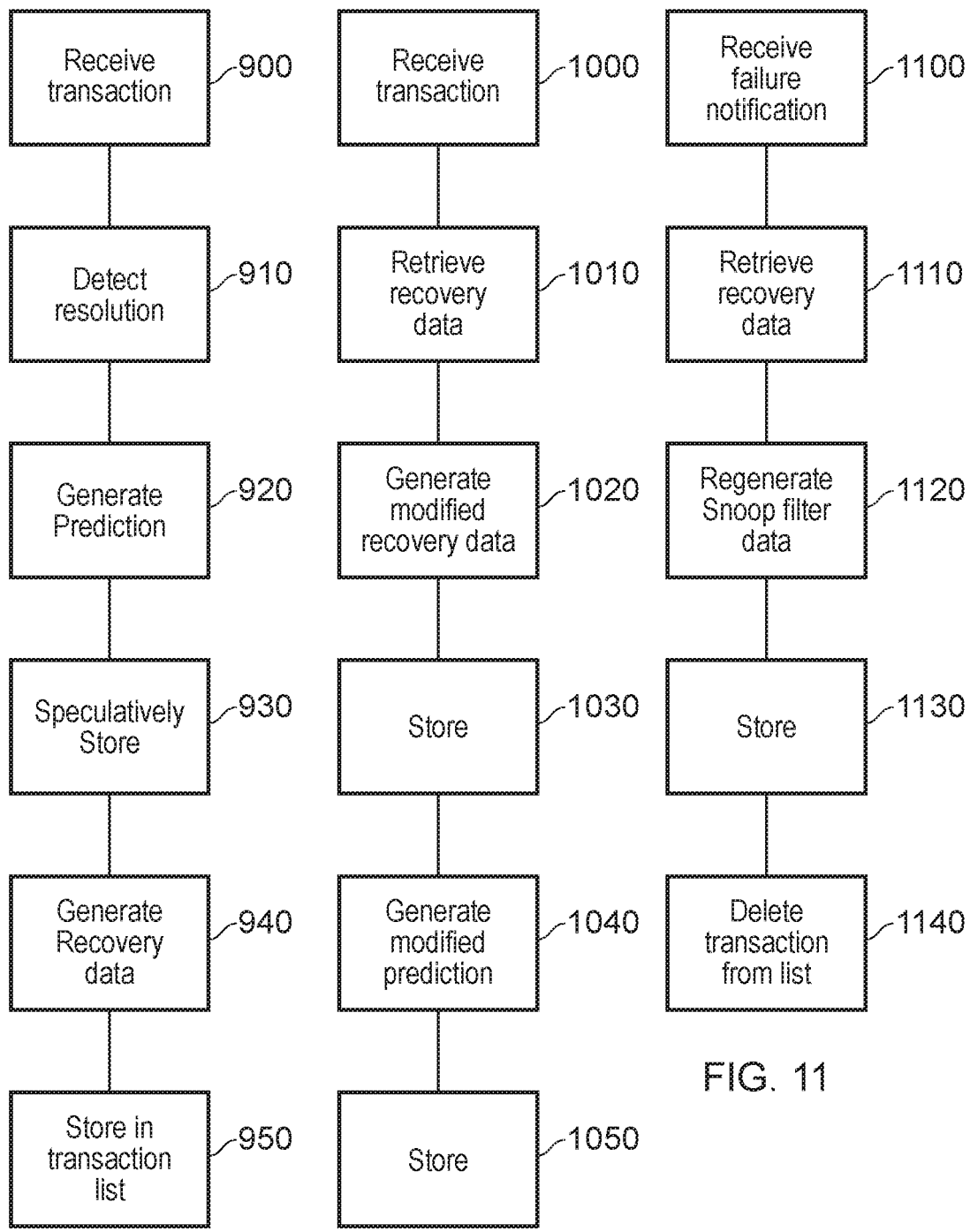

GENERATING RECOVERY DATA FOR AN INITIAL STATE OF STATUS DATA FOR A DATA HANDLING TRANSACTION AND PREDICTING A REVISED STATE OF THE STATUS DATA APPLICABLE TO RESOLUTION OF THE DATA HANDLING TRANSACTION

BACKGROUND

This disclosure relates to circuitries and to methods.

In a data processing system with multiple nodes, at least some of which are part of a coherency domain, it can be necessary to check the status of stored copies of a data item held at different nodes before an access to that data item is made, for example using a so-called snoop transaction. A so-called snoop filter can be used as part of this process, and can itself store data indicating the current coherency status of a data item, in part so as to avoid having to send snoop transactions that would have no useful effect in terms of changing the state of a stored version of the data item or returning any useful data. In at least some examples, the snoop filter can store data indicating at least whether or not the data item is stored at a particular node.

The data item might actually be accessed by, for example, a data-handling transaction such as a read or write transaction.

Once the data-handling transaction is resolved, it is generally necessary to update the snoop filter data to reflect the changed coherency status of that data item.

Dealing with a data-handling transaction, which may for example require an address translation stage and/or an access to a device external to the device at which the snoop filter is held, can take a long time, for example up to several hundred clock cycles.

SUMMARY

In an example arrangement there is provided circuitry comprising:

a data store to hold status data indicating a status of a first set of one or more devices connected to the interconnect circuitry; and control circuitry, responsive to initiation of a data handling transaction, to generate recovery data indicative of an initial state of the status data and to predict a predicted revised state of the status data applicable to resolution of the data handling transaction;

the control circuitry being configured to change the status data to the predicted revised state in response to initiation of the transaction and before resolution of the transaction, and in response to a request to access the status data between the change of the status data to the predicted revised state and the resolution of the transaction, to provide access to the initial state of the status data, using the recovery data.

In another example embodiment there is provided circuitry comprising:

means for storing status data indicating a status of a first set of one or more devices connected to the interconnect circuitry; and control means, responsive to initiation of a data handling transaction, for generating recovery data indicative of an initial state of the status data and for predicting a predicted revised state of the status data applicable to resolution of the data handling transaction;

the control means being operable to change the status data to the predicted revised state in response to initiation of the transaction and before resolution of the transaction, and in response to a request to access the status data between the change of the status data to the predicted revised state and the resolution of the transaction, to provide access to the initial state of the status data, using the recovery data.

In another example embodiment there is provided a method comprising:

storing status data indicating a status of a first set of one or more devices connected to the interconnect circuitry;

generating, in responsive to initiation of a data handling transaction, recovery data indicative of an initial state of the status data;

predicting a predicted revised state of the status data applicable to resolution of the data handling transaction;

changing the status data to the predicted revised state in response to initiation of the transaction and before resolution of the transaction; and in response to a request to access the status data between the change of the status data to the predicted revised state and the resolution of the transaction, providing access to the initial state of the status data, using the recovery data.

Further respective aspects and features of the present disclosure are defined by the appended claims.

BRIEF DESCRIPTION OF THE DRAWINGS

The present techniques will be described further, by way of example only, with reference to embodiments thereof as illustrated in the accompanying drawings, in which:

FIG. 4 is a schematic timing diagram;

FIGS. 5 and 6 are schematic flowcharts illustrating respective methods;

FIGS. 9-11 are schematic flowcharts illustrating respective methods;

DESCRIPTION OF EMBODIMENTS

Figure 1:
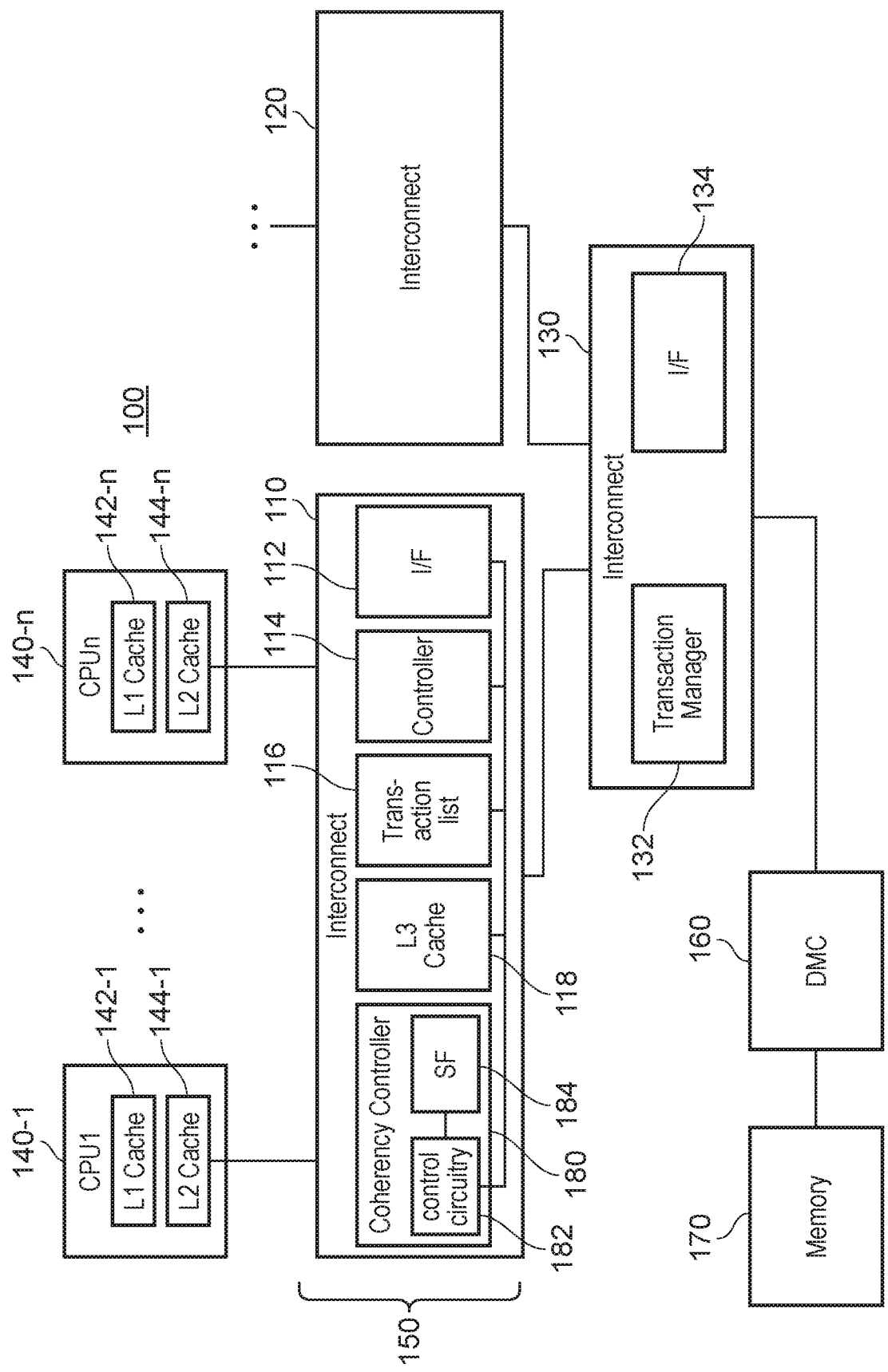
FIG. 1 schematically illustrates a data processing system.

Referring now to FIG. 1, a data processing system 100 comprises a hierarchy of interconnects 110, 120, 130. The interconnects 110, 120 are similar in function and in their level within the hierarchy; only the interconnect 110 will be described in detail but corresponding features and attributes apply to the interconnect 120.

The interconnect 110 is connected to a set of one or more first devices, in this example processing elements (CPU s) 140-1 . . . 140-*n*. In some examples, up to eight such CPUs may be provided. The present techniques will, however, still work even if only one such CPU 140-1 is provided.

Each CPU has a level I (L1) cache 142-1 . . . 142-*n* and a level II (L2) cache 144-1 . . . 144-*n*. Data and/or instructions for use by the respective CPU can be stored locally in the level I cache and/or the level II cache. Note that in some example arrangements there can be two level I caches (at least at a logical level): one for instructions and one for data. The cache memories 142, 144 provide an example in which the data storage associated with the first set of one or more data processing devices comprises a cache memory associated with at least one of the devices of the first set of data processing devices.

A first level 150 of the interconnect hierarchy is represented by the interconnects 110, 120. Note that other interconnects or indeed other components could be provided at this level of the hierarchy. A second level of the interconnect hierarchy is represented by the interconnect 130. Further hierarchical levels could be provided but are not shown in FIG. 1. The interconnect 130 is itself connected to a dynamic memory controller (DMC) 160, which is in turn connected to one or more memories 170. The interconnect 130 therefore provides an example of further circuitry provides a data communication path between the first circuitry (such as the interconnect 110) and a data memory (such as the one or more memories 170).

Data communication within the system FIG. 1 is by means of so-called data handling transactions which are transmitted from a transaction source or initiator, via a data communication path which may involve one or more of the interconnects, for resolution by a transaction target device which in turn sends back to the transaction initiator one or both of: a requested data item (in the case of a data handling transaction such as a read data transaction which requests a data item to be provided) and an acknowledgment of completion or resolution of the data handling transaction. Data handling transactions can be initiated by various devices in the system, such by as one of the CPUs 140-1 . . . 140-n, by an equivalent or similar device such as another CPU or a graphics processing unit (GPU) connected to the interconnect 120, by control circuitry such as the coherency controller 180 of the interconnect 110, by the second level interconnect 130 and so on.

The first level interconnect 110 comprises (at least in this example) interface (I/F) circuitry 112, a controller 114, a memory storing a transaction list 116, a level III (L 3) cache 118 and a coherency controller 180 comprising at least control circuitry 182 and a snoop filter (SF) 184. The interface circuitry 112 operates to handle the passing of data (including data handling transactions) to and from devices connected to the interconnect 110.

The second level interconnect 130 comprises at least a transaction manager 132 and interface circuitry 134. The transaction manager 132 will be described further below. The interface circuitry 134 operates to handle the passing of data (including data handling transactions) to and from devices connected to the interconnect 130.

In terms of data handling transactions which pass via the interconnect 130, the transaction manager 132 is arranged to order the transactions in a transaction handling order. So, for example, if the interconnect 130 receives a data-handling transaction from the interconnect 110 or a device connected to the interconnect 110, and also receives a data-handling transaction from the interconnect 120 or a device connected to the interconnect 120, the transaction manager 132 will select an order of transaction handling as between the two received transactions.

Considering an example data handling transaction initiated by a device connected to the interconnect 110, it may be that some transactions such as a request by a CPU (for example the CPU 140-1) to access a particular data item can be resolved by (for example) obtaining the required data item from a cache memory held by another one of the CPUs such as the CPU 140-n or by obtaining the required data item from the level III cache memory 118 of the interconnect 110. In the case that a request may be met from another device 140 connected to the same interconnect as the original requesting device, this is an example in which the coherency controller is configured to control forwarding of the data handling transaction to one or more other data processing devices of the first set of one or more data processing devices when the status data indicates that the data handling transaction can be resolved by a data processing device of the first set of data processing devices.

If neither of these is possible then be transaction may be forwarded to the interconnect 130 for handling. As mentioned, the interconnect 130 is part of a data communication path between the interconnect 110 and the memory 170 so that a transaction forwarded to the interconnect 130 may be resolved by accessing the memory 170. On the other hand, the interconnect 130 could route that transaction to another first level interconnect such as the interconnect 120 for resolution by a device such as a CPU cache or GPU cache connected to the interconnect 120.

So-called coherent operation and the operation and relevance of the coherency controller 180 will now be described.

In example embodiments, the interconnect circuitries 110, 120, 130 may represent an example of so-called cache coherent interconnect circuitry, being connectable to and controlled (for the purposes of maintaining coherence) by one or more coherency controllers 180. Here, the term "coherent" refers to the maintenance of a correct or required relationship between (potentially) multiple copies of the same data stored across the whole system. For example, data may be stored in a cache memory 142-1, 144-1 at one of the data processing nodes (such as the CPU 140-1). Other data processing nodes such as the CPU 140-n may have their own respective caches 142-n, 144-n which, depending on the nature of the processing operations, may also store one or more copies of data which is also held in the cache memory 142-1, 144-1. A copy of the same data may be held in the level III cache 118.

In these examples in which one or more data processing nodes have respective associated cache storage; the apparatus comprises a coherency controller 180; and the one or more memories and the cache storage are configured to operate under the control of the coherency control circuitry to store one or more copies of data accessible by each data processing node of the system, so that data written to a memory address in the coherent memory circuitry by one processing element is consistent with data read from that memory address in the coherent memory circuitry by another of the processing elements. In the case of a data handling transaction by one node with relevance to such stored information, there is a need to ensure that the accessing node is accessing the latest version of the stored information, and that if it makes any alteration to the stored information, either any other versions are correctly altered themselves or the other versions are deleted or invalidated.

In general terms, the cache memories 142-1, 144-1, 142-n, 144-n, 118, under the control of the coherency controller 180, provide coherent memory circuitry storing one or more copies of data accessible by each of the processing elements (for example, each of the processing elements connected via the interconnect circuitry 110, 120, 130), so that data written to a memory address in the coherent memory circuitry by one node in the system is consistent with data read from that memory address in the coherent memory circuitry by another node in the system. Note that in the case that separate level I instruction and data caches are provided, it could be that one or both of these is not in fact a coherent cache. For example, in some examples, the level I instruction cache is not a coherent cache (whereas the level I data cache might be coherent).

The role of circuitry associated with the cache coherence function is therefore to ensure that before a data handling transaction takes place, if the data handling transaction involves modifying a data item, then cache coherence logic avoids conflicts with other existing copies of the data item, for example by invalidating other coherent copies. Techniques for achieving this can include (for example) the use of one or more so-called "snoop filters" such as the snoop filter 184.

The term "snoop filter" is a historical one and is used here to refer to a control device forming part of the coherency controller 180 having an associated "directory", where the directory stores information indicating which data is stored in which cache memory, and the snoop filter itself at least contributes to the handling of data accesses to cached information so as to provide a cache coherence function. So, the snoop filter 184 having a directory as discussed above and a register indicating those cache memories which are currently part of the coherency control arrangement (otherwise referred to as being in the coherent system or in the coherent domain) forms part of the coherency controller 180 associated with the interconnect circuitry 110.

The snoop filter 184 handles at least a part of a process under which, when any of the nodes connected to any of the interconnects 110, 120, 130 intends to access or modify data which is stored as a cache line in any of the cache memories, that node obtains permission to do so. As part of this process, the snoop filter checks whether any other cache memories have a copy of the line which is to be modified. If any other copies are in existence at other cache memories, then those copies may need to be cleared and invalidated. If those copies themselves contain modifications to the stored data in that line, then in at least some circumstances, the coherency controller 180 (or the snoop filter itself) instructs the cache memory to write that line back to main memory or (in other examples) the coherency controller 180 instructs the relevant cache memory to return the line to the coherency controller which then writes it back to main memory.

In the case of a read access by a node with respect to data stored in a cache memory, it is important that the node requesting the read has access to the latest correct version of the cached data. The coherency controller 180 oversees this process so that if another cache has a more-recently-modified version of the required data, that other cache writes back the modified version and/or forwards a copy of the modified version for caching at the currently requesting node.

The coherency controller 180 including the snoop filter therefore provides an example of a cache coherency controller configured to coordinate, amongst the cache memories, an access to a memory address by one of the cache memories when the directory indicates that another of the cache memories is caching that memory address. The snoop filter may store or provides a directory such as the directory mentioned above indicating, for memory addresses cached by one or more of a group of one or more cache memories connectable in a coherent cache structure, which of the cache memories are caching those memory addresses.

The coherency controller can also retain a directory indicating the nature of coherency applicable to each of the cache memories in the system. For example, a cache memory may be referred to as "fully coherent" or "I/O coherent" (where I/O is an abbreviation of "input/output"), or outside of the coherency management of the system. A difference is that the CPU and GPU maintain their own coherent cache storage of at least some data items (and so can be "fully coherent"), whereas the other peripherals do not. Therefore the other (I/O coherent) peripherals have a requirement for coherency during data read or write operations, while the fully coherent CPU and GPU have a requirement for coherency relating to their own cached copies of at least some data items.

The snoop filter data not only indicates any actions which may be needed in order to maintain the required coherency when a data handling transaction takes place; it also provides information to the interconnect 110 as to where a data handling transaction could or should be routed in order to resolve that data handling transaction.

In a potentially large system of the type shown in FIG. 1, it is not necessary that the coherency controller 180 of one of the first level interconnects 110 has complete information about where every data item in the entire system is held. Instead, the coherency controller 180 could store that part of such information which is relevant to the set of one or more devices 140 directly associated with that interconnect, for example holding data in the form shown in one of the examples of FIGS. 2A and 2B.

Figure 2A:
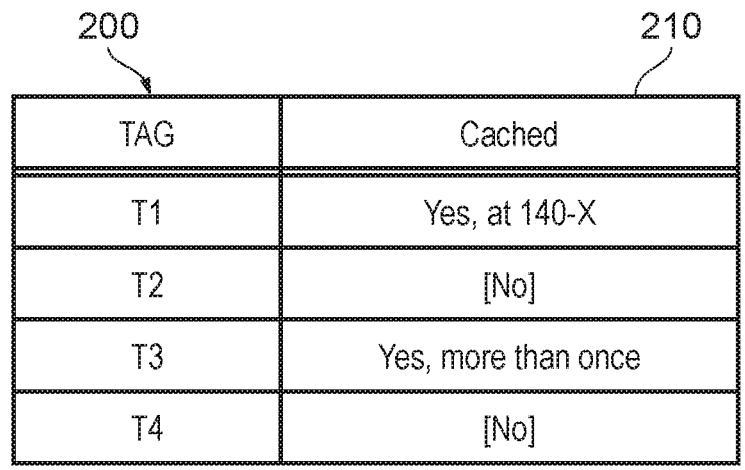
FIGS. 2A and 2B schematically represent example contents of a snoop filter.
Figure 2B:
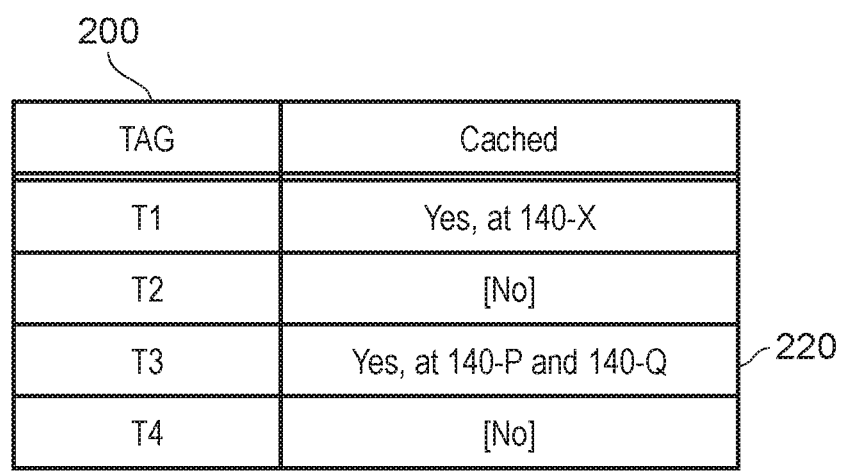

FIGS. 2A and 2B schematically represent different respective options for the type of data which might be stored in the snoop filter 184. In each case, there is a need to identify a particular cache line or address range under discussion, and in FIGS. 2A and 2B this is achieved using so-called tag information (which identifies an address or address range applicable to a data item such as a cache line) shown schematically in a column 200 as four example tags T1 . . . T4.

In FIG. 2A, a "cached" column 210 indicates various options applicable to data under consideration at a particular first level interconnect such as the interconnect 110, namely:
  a) "yes, the data is cached at a single specific device 140";
  b) "no, the data is not cached anywhere under the control or surveillance of this snoop filter" (which in this example is indicated for T2, but may in a real embodiment be represented simply by the absence of any entry for T2); or
  c) "yes, the data is cached by more than one local device 140 but the specific devices are not specified".

Another situation, namely "yes the data is held elsewhere, which is to say at a device associated with one of the other interconnects 120, 130 in the system" is something that the interconnect 110 would not in fact be expected to know. This situation is therefore, from the point of view of the interconnect 110, equivalent to a "no" situation which (as described above for T2) may or may not be explicitly encoded.

Note that if a line under consideration is cached in a local device (situation (a) above), the snoop filter can also contain information about whether the copy cached in a local device is exclusive, which is to say whether it is guaranteed that nowhere else in the system possesses a copy. An exclusivity flag or other indicator may be associated with an entry to indicate this status.

A similar arrangement is shown in FIG. 2B, but here the "more than once" option indicates 220 one or more of the devices 140 at which the data is cached.

Therefore, the snoop filter 184, as described with reference to FIGS. 2A and 2B, provides an example of the data store is configured to hold status data indicating, for data storage associated with the first set of one or more data processing devices 140 connected to the interconnect circuitry, a coherency status of one or more data items stored by the data storage. In these examples, the data items are cache lines; the data store is a snoop filter; and the status data is indicative of whether a given data item is stored by the respective cache memory of the at least one of the devices of the first set of data processing devices.

Figure 3A:
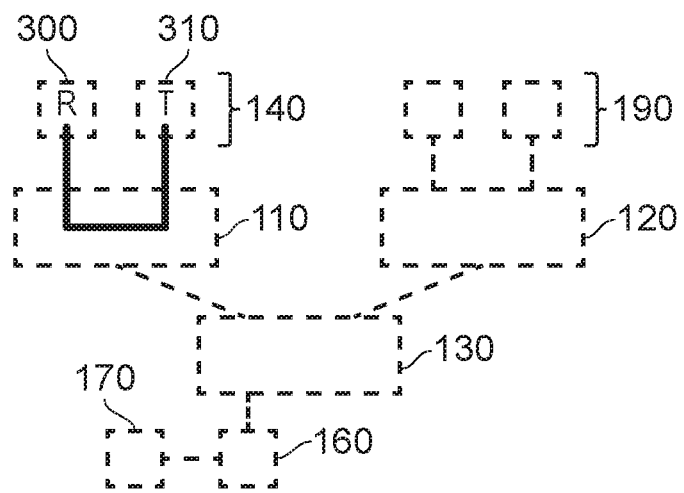
FIGS. 3A-3C schematically represented example transaction routing in the system of FIG. 1.
Figure 3B:
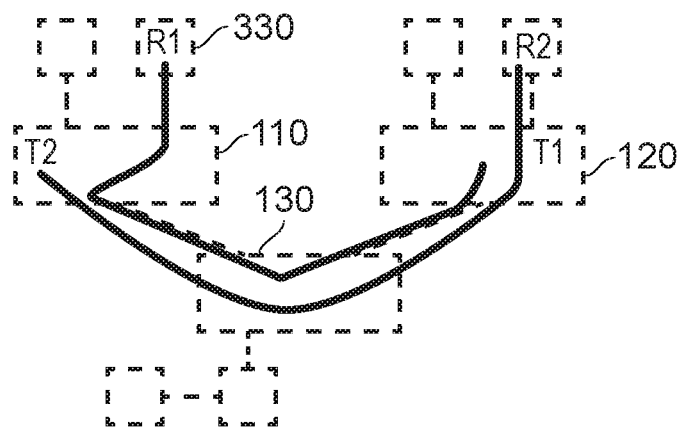
Figure 3C:
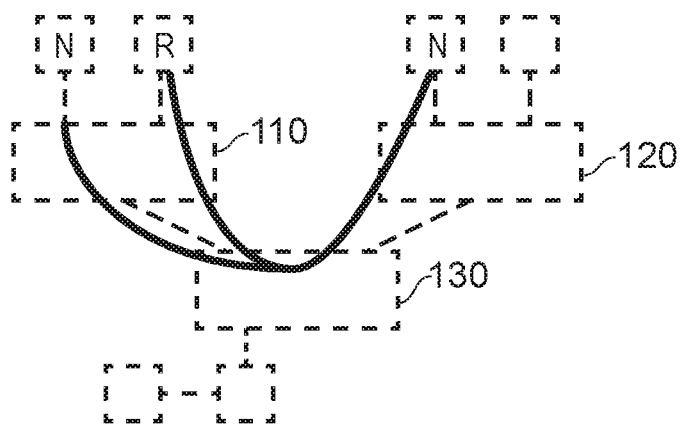

FIGS. 3A to 3C schematically represent examples of data handling transactions which may affect the contents of the snoop filter. In FIGS. 3A to 3C, the circuitry or apparatus FIG. 1 is represented at a high level using the same numerals as in FIG. 1, except that one or more devices 190 connected to the interconnect 120 are explicitly shown. A requesting device is labeled with an "R", and the target selected in response to the snoop filter data is indicated by a "T".

Generally speaking, as the examples are drawn, the snoop filter in a particular interconnect knows, or has information about, data held by the devices above it, and also the contents of its own local cache, but does not hold specific information about what is held in devices associated with paths below that interconnect.

In FIG. 3A, one of the devices 140 requires access to a data item which the snoop filter 184 of the interconnect 110 shows is held by another one of the devices 140. So, a data-handling transaction to obtain a copy of that data item is established by an initiating device 300 and routed by the interconnect 110 to a device 310 indicated by the snoop filter to be holding a copy of the required data item. the result of the operation can be to change the snoop data held at the interconnect 110.

In an example in FIG. 3B, a device 330 requires a data item held in the level III cache of the interconnect 120, so a transaction is passed from a requesting device R1 via the interconnect 130 to the interconnect 120 (target T1) in order to retrieve that data item. At the same time, assume that another transaction, from a requester R2 to a target T2 at the interconnect 110, in connection with the same memory address, is also initiated.

The interconnect 130 has to control the order in which the two transactions are handled. Assume for the sake of discussion that the transaction from R1 is ordered by the interconnect 130 to be handled first. The interconnect 130 (on behalf of the transaction for R1) has to query the second requester R2 (via its intermediate interconnect 120) to control coherency. An example of the relevance of this to the present description is that the snoop data held at each of the interconnects 110, 120, 130 can be altered as a result of the first and second transactions of the two transactions listed above.

In a further example of FIG. 3C, a requester R requests exclusivity for a particular data item of which copies are currently held by other nodes N. The interconnect 130 needs to send invalidation requests to the multiple nodes N, so that snoop data can be altered at the interconnects 110, 120, 130.

The operations represented schematically by at least FIG. 3B provides an example in which the coherency controller 180, comprising at least a part of the control circuitry 182 and responsive to a data handling transaction for a given data item initiated by one of the first set 140 of data processing devices, is configured to detect from the status data (in the snoop filter 184) whether resolution of the given data handling transaction requires access to a data processing device (190, 130, 170) other than the first set of data processing devices 140; and the coherency controller 180 is configured to control forwarding of the given data handling transaction to a device of a second, different, set of one or more data processing devices 130 connected to the interconnect circuitry for resolution of the data handling transaction when the status data indicates that resolution of the data handling transaction requires access to a data processing device other than the first set of data processing devices.

These drawings also provide examples in which the interconnect 130, as an example of further circuitry, is configured to issue a request to the first circuitry to access the status data (for example, as stored by the snoop filter 184) for a given data item as part of initiating a data handling transaction to access the given data item.

The processing and launching of data handling transactions will now be discussed further with reference to FIGS. 4 to 6.

FIG. 4 is a schematic timing diagram, with time progressing towards the right-hand side of the page as drawn. At a time point T1, a device such as a CPU 140 establishes a new data-handling transaction, for example to read or write a particular data item such as a cache line. This data-handling transaction is passed to the interconnect 110 where the control circuitry 182 oversees a step 500 of FIG. 5 to receive and process the transaction. Steps applicable to the step 500 FIG. 5 will be discussed with reference to FIG. 6. When the process of FIG. 5 step 500 has been completed, the transaction is launched at a time point T2, at which stage it is routed by the interconnect 110 to its target or destination. The data-handling transaction is also stored in the transaction list 116 which maintains a list of ongoing data-handling transactions. The data-handling transaction is considered as "ongoing" for a period 400 of FIG. 4, which is to say between its being accepted and launched by the interconnect 110 and its resolution at a time T3. The resolution is represented by a step 520 of FIG. 5, at which time the interconnect 110 receives the transaction resolution which may be, for example, a required data item in the case of a data read transaction and/or an acknowledgment of completion signal. In the case of a data read transaction, the acknowledgment of completion signal may be implied by the return of the required data item, or may be provided separately and in addition to the return of the required data item. In other examples such as a data write transaction, no data other than the acknowledgment of completion signal is returned by the transaction target device. In response to the transaction resolution, the data-handling transaction is deleted from the transaction list 116.

Note that the stages of FIG. 4 relate to a device establishing a transaction at the time T1, and the interconnect 110 launching the transaction to its target at the time T2. Each of these may be considered as the initiation of the transaction, so that actions taken "in response to initiation of a transaction" can be considered to be taken in response to one or both of the device setting up the transaction in the first place, and/or the interconnect accepting and launching the transaction to its target. From the point of view of the interconnect circuitry itself, however, the generation of recovery data and the speculative update can be carried out in response to the interconnect itself launching the transaction but could instead be carried out prior to launch of the transaction.

FIG. 6 shows the steps associated with the step 500. It is noted that the steps 610 . . . 630 of FIG. 6 are generally carried out by the control circuitry 182 in parallel, so that a step 600 at which structural hazards are detected is carried out first in the present examples. These steps are all related to the operations performed on a data-handling transaction newly received from a connected device 140, 190 and before the transaction is launched by the interconnect 110, 120 for resolution.

At the step 600, the control circuitry 182 checks the controller 114 and the interface circuitry 112 to detect any so-called structural hazards, which is to say any instances in which there are insufficient physical or logical resources to support the launching of a transaction. If there is a structural hazard then once again the newly handled transaction is stalled, deferred or refused. This provides an example in which the control circuitry 182 is configured to detect whether the circuitry has sufficient processing resources to process a data handling transaction.

At a step 610, the control circuitry 182 accesses the tags of the level III cache memory 118 held by the same interconnect 110, 120 to detect once again whether the required data item can be obtained from the level III cache 118 without the need to transmit a data-handling transaction externally to the interconnect 110. Therefore, in these examples, the circuitry 110 comprises a further cache memory 118 (in the sense that it is further to the cache memories 142, 144) and the control circuitry 182 is configured to detect whether the given data item is currently held by the further cache memory.

At a step 620 the control circuitry 182 checks the transaction list 116 to detect any so-called address hazards, which is to say an attempt to launch to transactions overlapping in time to access the same cache line or data item. If there already exists an ongoing transaction in the transaction list 116 for the same memory address as the transaction currently being processed by the step 500 then the more recent transaction is inhibited from being launched, which is to say it can be stalled or deferred, or it can be refused so that the requesting device has to re-submit the transaction later.

The step 620 therefore provides an example of the coherency controller inhibiting the initiation, by a device of the first set of devices, of a data handling transaction to access a given data item while another data handling transaction to access the given data item, initiated by another device of the first set of devices, has not yet been resolved.

At the step 630, the control circuitry 182 accesses the snoop filter 184 to detect the coherency state of the required data item, whether any other copies of the relevant data item need to be updated and/or invalidated before the transaction can be carried out (if any such actions are needed then the coherency controller 180 can initiate such actions at this stage), and also whether the data-handling transaction can be resolved by access to a local cache held by one of the other devices connected to the same interconnect 110, 120.

Significantly, these operations are all carried out by the control circuitry 182. For this reason, technical features provided by the present embodiments and as discussed below can be advantageous in order to reduce the usage of the control circuitry 182. By making the decision about what snoop filter write to perform on the same pass through the control circuitry pipeline as the snoop filter lookup can reduce the number of pipeline passes needed through the control circuitry compared to performing the lookup on one pass, waiting for the time T3 and then updating the snoop filter on a final pass. It can also slightly reduce the usage/lifetime of certain structures (such as the transaction list) because the snoop filter does not need updating after the time T3, so in many cases the transaction list can be freed sooner after the time T3. In this connection note that (a) a write access to the snoop filter 184 cannot be carried out at the same time as the step 630, given that the step 630 requires an examination of (or in other words, a read access to) the whole of one index of the snoop filter; and (b) executing a write access to the snoop filter 184 occupies resources of the control circuitry 182.

As discussed with reference to FIGS. 3A-3C above, the resolution of a data-handling transaction can result in a change being required to the snoop filter data held at an interconnect such as the interconnects 110, 120. However, if a data-handling transaction involves accessing storage externally to the interconnect 110 and its locally connected devices, the latency or delay period between launching the transaction (the time T2 in FIG. 4) and obtaining resolution of the transaction (the time T3 in FIG. 4) can be considerable, for example many hundreds of clock cycles.

In previously proposed arrangements in which the updating of the snoop filter was carried out in response to the resolution of a data-handling transaction, this implies two accesses to the snoop filter: one at the step 630 in preparation for launching the data-handling transaction, and one at the step 520 in response to resolution of the data-handling transaction. However, in examples of the present disclosure, these two accesses are combined into a single operation, or at least a single stage in the processing, in that at the time of launching the transaction, a predicted change to the snoop filter data is generated and implemented, so that the snoop filter data is altered to the state it will hold (or is predicted to hold) when the data-handling transaction currently being launched is resolved.

Figure 7:
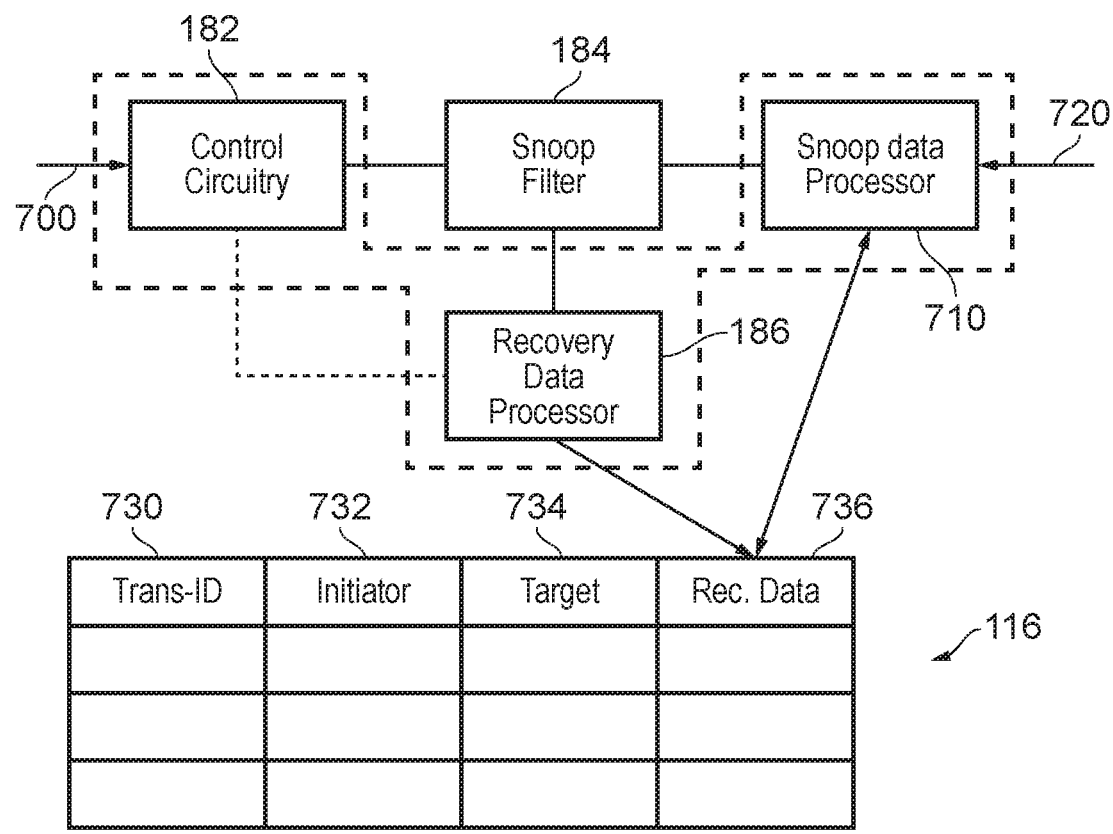
FIG. 7 schematically illustrates the generation and use of recovery data.

An example arrangement is illustrated schematically in FIG. 7. Here, the control circuitry 182 fulfills the functionality discussed above but also acts to generate a predicted change to the snoop filter 184 data and store it at the snoop filter 184 in response to initiation or launch of a data-handling transaction which, when resolved, will result in that change to the snoop filter data. As indicated schematically by a broken line box linking together the control circuitry 182, a recovery data processor 186 and a snoop data processor 710 to be discussed below, the control circuitry 182 can fulfill these multiple functions. In this way the control circuitry 182 also fulfills the functionality of the recovery data processor 186 which generates and stores in the transaction list 116, in association with the relevant data-handling transaction, so-called recovery data 736 allowing the regeneration of the previous state of the snoop filter 184 before the predicted change was speculatively implemented by the control circuitry 182.

As shown in FIG. 7, the transaction list 116 stores fields such as a transaction identifier (trans-ID) 730, an identification 732 of the data-handling transaction initiator (such as a CPU 140 of FIG. 1), an identification 734 of the data-handling transaction target, such as the memory 170, and the recovery data 736 generated by the recovery data processor 186 which can be used to reproduce the previous contents of the snoop filter or in other words to "undo" the effect of the speculative change made by the control circuitry 182 as a prediction of the change which would be made to the snoop filter 184 in response to resolution of the transaction.

The storage of recovery data in this way provides an example in which the coherency controller is configured to store pending transaction data 116 indicative of data handling transactions which have been initiated but not yet resolved; and the control circuitry 182/186 is configured to store the recovery data, generated in response to initiation of a given data handling transaction, in association with the pending transaction data for the given data handling transaction.

The recovery data can take various forms and these can depend upon the nature of the changes predicted by and intimate by the control circuitry 182. Some examples are:

data defining an expected change in coherency status which will result from the completion or resolution of the data handling transaction;

a copy of the original state of the relevant snoop filter entry;

difference data defining a bitwise difference between the original state and the speculatively updated state of the snoop filter entry.

In the context of generating and speculatively storing the predicted change to the snoop filter data, an input 700 to the control circuitry comprises details of the transaction currently being launched, namely the type of data access and where the resulting data will be stored.

However, in another mode of operation, the control circuitry can also serve as a snoop data processor 710 which operates in the context of an input 720 representing a request, for example relating to a transaction initiated outside of the interconnect 110, which will have the effect of accessing and/or altering the snoop data held at the interconnect 110. For example, considering the situation in FIG. 3B described above, the interconnect 130 initiates a transaction to alter the snoop data held at the interconnect 110 in response to a data-handling transaction actually established by the device 320 connected to the interconnect 120. For reasons discussed below with reference to FIG. 8, such a data-handling transaction having the effect of altering the snoop data held at a particular interconnect can occur after a data-handling transaction (for which a speculative change has been made to that snoop data) has already been launched by the particular interconnect.

Therefore, in these examples, the further circuitry (such as the interconnect 130) is configured to handle a data handling transaction requested by a device connected to the further circuitry and is configured to initiate data handling transactions.

Figure 8:
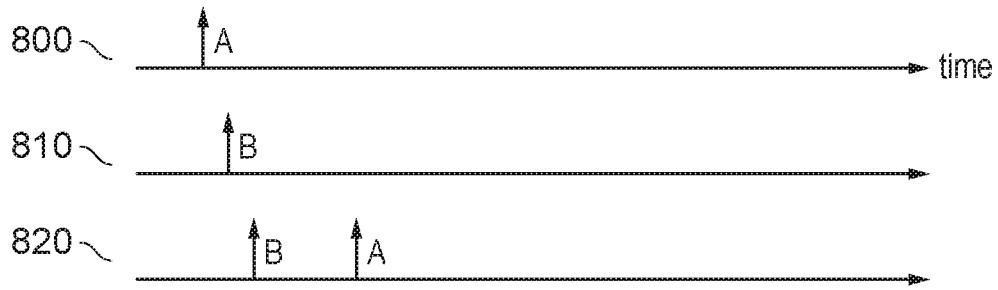
FIG. 8 is a schematic timing diagram.

FIG. 8 is a schematic timing diagram with time running from left to right as drawn. A top row 800 represents a time at which the interconnect 110 launches a transaction A corresponding to the step 510 performed by the interconnect 110. The transaction A results in a speculative change by the control circuitry 182 to the data held by the snoop filter 184 at the interconnect 110, in respect of a particular cache line.

In a second row 810, the interconnect 120 launches a transaction B also related to that same cache line and which, for example using the mechanisms discussed above, will result in a change to the snoop data held at the interconnect 110.

The transaction manager 132 of the interconnect 130 is responsible for ordering transactions handled by the interconnect 130, and in this particular example elects to allow the transaction B to occur before the transaction A. This is shown by a third line 820 of FIG. 8. Accordingly, in example arrangements, the interconnect 130 (as an example of further circuitry) is configured to apply a transaction handling order to a set of data handling transactions being handled by the further circuitry.

The result is that from the point of view of the interconnect 110, the interconnect 110 has launched the transaction A and has made a speculative change to the snoop filter 184. However, unknown to the interconnect 110, that transaction A is preceded by the transaction B which will also require a change to the snoop filter 184. However, the snoop filter 184, during the processing of the transaction B, does not represent the currently valid situation at the interconnect 110 because it has been speculatively updated and will only represent a valid situation when the transaction A has been resolved.

To address this potential issue, the snoop data processor 710 (drawn separately but which may be implemented by the control circuitry 182 for example) receives at an input 720 the transaction B and accesses the recovery data in the transaction list 116. This allows the snoop data processor 710, either independently of the snoop filter 184 contents or by combining the recovery data with the snoop filter 184 contents, to recreate the previous version of the snoop filter data, which is to say before the speculative update applicable to the transaction A. The snoop data processor 710 implements any change required by the transaction B to the recovered snoop data and stores replacement recovery data indicative of the change just made by the snoop data processor 710 back to the transaction list 116.

Significantly, however, the speculatively updated predicted change to the snoop data held by the snoop filter 184 may now no longer be corrected, given that the stored change related to a prediction of what would happen when the transaction A was resolved, based upon a now-out-of-date starting position. The correct starting position is that state just generated by the snoop data processor 710 in response to the transaction B. Therefore, the snoop data processor 710 not only potentially changes the recovery data held by the transaction list 116 but also changes the predicted and speculatively updated change already made to the snoop filter 184 data.

Therefore, the arrangement of FIG. 1, operating as just described, provides an example of circuitry 100 comprising: a data store 184 to hold status data indicating a status of a first set of one or more devices connected to the interconnect circuitry; and control circuitry 182, responsive to initiation of a data handling transaction, to generate recovery data indicative of an initial state of the status data and to predict a predicted revised state of the status data applicable to resolution of the data handling transaction; the control circuitry being configured to change the status data to the predicted revised state in response to initiation of the transaction and before resolution of the transaction, and in response to a request to access the status data between the change of the status data to the predicted revised state and the resolution of the transaction, to provide access to the initial state of the status data, using the recovery data.

Some worked examples will now be discussed.

Example 1

Speculative Update But No Intervening Access Needed

This is based on the format of snoop filter data shown in FIG. 2B.

This process will be described further with reference to FIG. 9 below.

Assume that a device 140-1 is requesting a copy of a cache line relating to the tag T1.

The control circuitry 182 detects at the step 630 that the required data is already cached at a device 140-X (assume that X does not equal 1). The interconnect 110 routes the data handling transaction to the device 140-X for resolution.

The snoop filter entry for the tag T1 is speculatively updated to the state "Yes, at 140-1 and 140-X". This speculative update can take place at any time between initiation of the transaction and its resolution, but it is potentially most advantageous to perform the speculative update at the same state as initiation of the transaction.

The recovery data processor 186 generates recovery data to allow the original state of the snoop filter data to be recovered if required. For example, the recovery data might be "yes, at 140-X", or "delete reference to 140-1", or any other format which allows the original entry to be recovered. The transaction list is updated with an entry as follows:

| Trans-ID | Initiator | Target | Recovery data |
|---|---|---|---|
| ID-n | 140-1 | 140-X | (as defined above) |

Example 2

Intervening Request to Access Snoop Filter Data

Assume that between the initiation of the data handling transaction ID-n and its resolution, another device such as the interconnect 130 requires access to the snoop filter data for the tag T1.

In this case, the snoop data processor 710 consults the transaction list 116, obtains the recovery data and regenerates the original state of the snoop filter entry "Yes, at 140-X" for the purposes of the access by the interconnect 130.

Example 3

Intervening Change to Snoop Filter Data

This process will be described further with reference to FIG. 10 below.

Assume that the access requested in example 2 actually represented a request to change the snoop filter data associated with the tag T1.

For example, assume that another node or the interconnect 130 requires (in response to other transaction activity within the overall system, for example) to update the snoop filter data for the tag T1 so as to indicate that the data item is also held at a cache associated with the CPU 140-Y.

This change means that both the speculatively updated version of the snoop filter data and the original version represented by the recovery data are incorrect.

The snoop data processor 710 therefore makes the following changes:

| | Changed From | Change to |
|---|---|---|
| Speculatively updated snoop filter entry for tag T1 | yes, at 140-1 and 140-X | yes, at 140-1, 140-X and 140-Y |
| Recovery data for tag T1 (see note below) | recovery data to allow reconstruction of: "yes, at 140-X" | recovery data to allow reconstruction of: "yes, at 140-X and 140-Y" |

Note that in the specific example that the recovery data is stored as an indication to "delete the reference to 140-1", a change to the recovery data may not actually be necessary, as the deletion of the reference to 140-1 will remain a valid action to take in order to regenerate the original snoop data field if required.

As discussed above in connection with FIG. 3C, this type of situation can happen where one requester already has the data but wants to obtain an exclusive copy of the line (i.e. invalidate all other copies of the line), and another requester wishes to read the line. Note: exclusivity is needed in a coherent system so that the line can be written while remaining in the cache of the device performing the write, as this ensures there are no stale copies elsewhere Example 4

Transaction Completes Successfully

In response to subsequent resolution of the data-handling transaction ID-n, the transaction list entry is deleted and the speculatively updated snoop data entry is considered valid.

Example 5

Transaction Subsequently Fails

This process will be described further with reference to FIG. 11 below.

The control circuitry 100 H2 and/or the recovery data processor 186 regenerate the snoop filter 184 data using the recovery data so as to return the speculatively updated snoop filter data to its original state (which might of course be the original state as subsequently updated by the process described with reference to Example 3). The transaction is deleted from the transaction list 116.

FIG. 9 is a schematic flow chart representing operations carried out by the control circuitry and the recovery data processor 186 in response to the launching by the interconnect 110 of a data-handling transaction.

A step 900 schematically represents the control circuitry 182 receiving details of the transaction being launched. However, it is noted that based upon operations such as those described with reference to FIGS. 5 and 6, the control circuitry 182 may already have such information available to it.

At a step 910 the control circuitry 182 detects the expected resolution of the transaction in question, for example the reading of a data item and storing that data item at a particular cache memory in the coherent system. Based upon this predicted resolution, the control circuitry 182 generates a predicted change to the snoop filter data held by the snoop filter 184 and at step 930 stores that change in the snoop filter 184. The recovery data processor 186 (which, as discussed above, may be implemented by the control circuitry 182) generates recovery data representing the original state of the snoop filter 184 data and at a step 950 stores this, for example as part of the transaction list 116.

In FIG. 10, operations of the snoop data processor 710 are represented. At step 1000 the snoop data processor 710 receives 728 transaction which requires at least access to and possibly a change to the data held by the snoop filter 184. At a step 1010 the snoop data processor 710 retrieves the recovery data from the transaction list 116. Based upon the nature of the transaction in question (the transaction B in FIG. 8) the snoop data processor 710 generates modified recovery data at a step 1020 and stores this at the transaction list 116 at a step 1030. The snoop data processor 710 then generates modified predicted snoop filter data at a step 1040 and stores this to the snoop filter 184 at step 1050.

FIG. 11 schematically represents operations carried out, for example, by the control circuitry 182 in response to the failure of a previously launched transaction. The failure can be signaled by a failure confirmation signal received in place of the acknowledgment of completion signal which would be expected in the case of a successfully resolved data-handling transaction.

At a step 1100 the control circuitry 182 receives the failure confirmation signal, for example as an input 700, and at a step 1110 retrieves the recovery data associated with the sales transaction. The control circuitry 100 H2 and/or the recovery data processor 186 can regenerate the snoop filter 184 data based upon the recovery data at a step 1120 and at step 1130 the regenerated snoop filter data is stored to the snoop filter 184. Finally, at a step 1140 the sales transaction is deleted from the transaction list 116.

In the discussion above, one significant reason why it is potentially advantageous to speculatively update the snoop filter at the time of launching a data-handling transaction rather than waiting to the end of the data-handling transaction relates to the multiple roles and functions of the control circuitry 182. These multiple roles mean that an update operation in response to resolution of a data-handling transaction could conflict with one or more of the other roles of the control circuitry 182.

Figure 12:
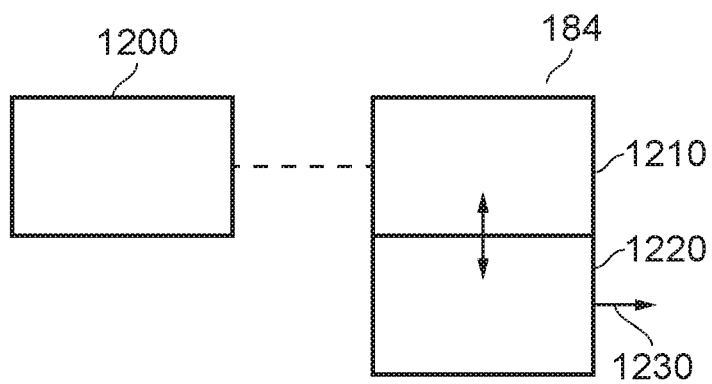
FIG. 12 schematically illustrates a partitioned snoop filter.

FIG. 12 schematically provides an explanation of another significant reason why it can be potentially advantageous to do the speculative updating.

FIG. 12 shows an aspect of the functionality of the snoop filter 184 and data store access circuitry 1200 which accesses the snoop filter 184 and which may, for example form part of the functionality of the control circuitry 182.

The snoop filter 184 comprises first 1210 and second 1220 data store portions. The data store access circuitry 1200 is configured to move the status data stored in the data store between the first and second data store portions as a housekeeping operation with respect to the snoop filter 184. The first data store portion 1210 can be considered as a "main" store of the snoop filter data. If this becomes too full, in that newly generated or acquired snoop filter data needs to be stored in the first data portion 1210 but the first data portion 1210 does not have sufficient space for the newly generated or acquired data, then the data store access circuitry 1200 is configured to move one or more data items from the first data store portion 1210 to the second data store portion 1220. The second state store portion 1220 can be considered as a "victim cache" in that it holds data items which would otherwise have been deleted in order to make space in the first data store portion 1210. In case of running out of storage space in the second data store portion 1220, one or more data items can be flushed (shown schematically by an arrow 1230) from the second data store portion. On the other hand, if space becomes available once again in the first data store portion 1210 then one or more data items can be moved by the data store access circuitry 1200 from the second data store portion 1220 to the first data store portion 1210.

Therefore the data store access circuitry 1200 is configured to move the status data stored in the data store between the first 1210 and second 1220 data store portions; and the data store access circuitry 1200 is configured to invalidate an instance of status data in the second data store portion 1220 in response to a requirement to provide a storage location for a newly generated instance of status data (note that in some implementations such a requirement for space in the main store may cause the moving of an existing data item from the main store to the victim cache, which in turn results in a requirement to delete an existing data item from the victim cache).

A reason why this is relevant to the present techniques is that this housekeeping operation of the data store access circuitry 1200 as just described can take place independently of the launching and resolution of data-handling transactions. A data item in the snoop filter 184 which had a particular storage location in the snoop filter 184 at the time of launching a data-handling transaction may, as a result of the housekeeping operation of the data store access circuitry 1200, have an entirely different storage location in the snoop filter 184 at the time of resolution of that same data-handling transaction. This means that if the updating of the snoop filter data is deferred until resolution of the data-handling transaction, the location in the snoop filter at which the relevant entry was located at the time of initially checking the snoop filter (the step 630 of FIG. 6) is no longer valid and the relevant snoop filter entry must be located once again from scratch. The need for this search process to locate the relevant snoop filter entry can be avoided in embodiments of the present disclosure in which the updating of the snoop filter entry is performed speculatively at the time of launching a data-handling transaction.

Figure 13:
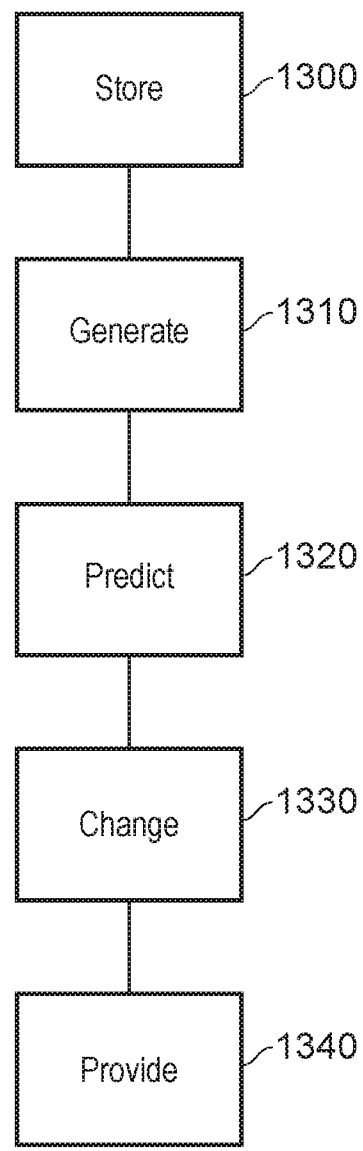
FIG. 13 is a schematic flowchart illustrating a method.

FIG. 13 is a schematic flowchart illustrating a method comprising:

storing (at a step 1300) status data indicating a status of a first set of one or more devices connected to the interconnect circuitry;

generating (at a step 1310), in responsive to initiation of a data handling transaction, recovery data indicative of an initial state of the status data;

predicting (at a step 1320) a predicted revised state of the status data applicable to resolution of the data handling transaction;

changing (at a step 1330) the status data to the predicted revised state in response to initiation of the transaction and before resolution of the transaction; and in response to a request to access the status data between the change of the status data to the predicted revised state and the resolution of the transaction, providing (at a step 1340) access to the initial state of the status data, using the recovery data.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Circuitry comprising:
   a data store to hold status data indicating a status of a first set of one or more data processing devices connected to interconnect circuitry; and control circuitry, responsive to initiation of a data handling transaction, to generate recovery data indicative of an initial state of the status data and to predict a predicted revised state of the status data applicable to resolution of the data handling transaction;

the control circuitry being configured to change the status data to the predicted revised state in response to initiation of the transaction and before resolution of the transaction, and in response to a request to access the status data between the change of the status data to the predicted revised state and the resolution of the transaction, to provide access to the initial state of the status data, using the recovery data.

2. Circuitry according to claim 1, in which the data store is configured to hold status data indicating, for data storage associated with the first set of the one or more data processing devices connected to the interconnect circuitry, a coherency status of one or more data items stored by the data storage.

3. Circuitry according to claim 2, comprising: a coherency controller, comprising at least a part of the control circuitry and responsive to a data handling transaction for a given data item initiated by one of the first set of the one or more data processing devices, configured to detect from the status data whether resolution of the given data handling transaction requires access to a data processing device other than the first set of the one or more data processing devices;

the coherency controller being configured to control forwarding of the given data handling transaction to a device of a different second set of the one or more data processing devices connected to the interconnect circuitry for resolution of the data handling transaction when the status data indicates that resolution of the data handling transaction requires access to a data processing device other than the first set of the one or more data processing devices.

4. Circuitry according to claim 3, in which the coherency controller is configured to store pending transaction data indicative of data handling transactions which have been initiated but not yet resolved; and the control circuitry is configured to store the recovery data, generated in response to initiation of a given data handling transaction, in association with the pending transaction data for the given data handling transaction.

5. Circuitry according to claim 1, in which the coherency controller is configured to inhibit the initiation, by a device of the first set of the one or more data processing devices, of a data handling transaction to access a given data item while another data handling transaction to access the given data item, initiated by another device of the first set of the one or more data processing devices, has not yet been resolved.

6. Circuitry according to claim 3, in which the device of the second set of the one or more data processing devices provides a data communication path between the interconnect circuitry and a data memory.

7. Circuitry according to claim 3, in which the coherency controller is configured to control forwarding of the data handling transaction to one or more other data processing devices of the first set of the one or more data processing devices when the status data indicates that the data handling transaction can be resolved by a data processing device of the first set of the one or more data processing devices.

8. Circuitry according to claim 3, in which the coherency controller comprises data store access circuitry configured to access the data store;

the data store comprises first and second data store portions;

the data store access circuitry is configured to move the status data stored in the data store between the first and second data store portions; and the data store access circuitry is configured to invalidate an instance of status data in the second data store portion in response to a requirement to provide a storage location for a newly generated instance of status data.

9. Circuitry according to claim 2, in which the data storage associated with the first set of the one or more data processing devices comprises a cache memory associated with at least one of the one or more data processing devices of the first set of the one or more data processing devices.

10. Circuitry according to claim 9, in which:

the data items are cache lines;

the data store is a snoop filter; and the status data is indicative of whether a given data item is stored by the respective cache memory of the at least one of the one or more data processing devices of the first set of the one or more data processing devices.

11. Circuitry according to claim 10, in which:

the circuitry comprises a further cache memory;

the control circuitry is configured to detect whether the given data item is currently held by the further cache memory.

12. Circuitry according to claim 11, in which the control circuitry is configured to detect whether the circuitry has sufficient processing resources to process a data handling transaction.

13. A data processing system comprising:

first circuitry comprising:

a data store to hold status data indicating a status of a first set of one or more data processing devices connected to the interconnect circuitry; and control circuitry, responsive to initiation of a data handling transaction, to generate recovery data indicative of an initial state of the status data and to predict a predicted revised state of the status data applicable to resolution of the data handling transaction;

the control circuitry being configured to change the status data to the predicted revised state in response to initiation of the transaction and before resolution of the transaction, and in response to a request to access the status data between the change of the status data to the predicted revised state and the resolution of the transaction, to provide access to the initial state of the status data, using the recovery data; and further circuitry connected to the first circuitry and configured to handle a data handling transaction requested by a device connected to the further circuitry.

14. A system according to claim 13, in which the further circuitry is configured to initiate data handling transactions.

15. A system according to claim 13, in which the further circuitry is configured to apply a transaction handling order to a set of data handling transactions being handled by the further circuitry.

16. A system according to claim 13, in which the further circuitry is configured to issue a request to the first circuitry to access the status data for a given data item as part of initiating a data handling transaction to access the given data item.

17. A system according to claim 13, comprising a data memory; and in which the further circuitry provides a data communication path between the first circuitry and the data memory.

18. A method comprising:
storing status data indicating a status of a first set of one or more data processing devices connected to the interconnect circuitry;
generating, in responsive to initiation of a data handling transaction, recovery data indicative of an initial state of the status data;
predicting a predicted revised state of the status data applicable to resolution of the data handling transaction;
changing the status data to the predicted revised state in response to initiation of the transaction and before resolution of the transaction; and
in response to a request to access the status data between the change of the status data to the predicted revised state and the resolution of the transaction, providing access to the initial state of the status data, using the recovery data.

\* \* \* \* \*